H. ANSCHÜTZ-KAEMPFE.
GYROSCOPE.
APPLICATION FILED OCT. 12, 1907.

973,611.

Patented Oct. 25, 1910.

2 SHEETS—SHEET 1.

Witnesses

Inventor
Hermann Anschütz-Kaempfe.
By his Attorney,

H. ANSCHÜTZ-KAEMPFE.
GYROSCOPE.
APPLICATION FILED OCT. 12, 1907.

973,611.

Patented Oct. 25, 1910.
2 SHEETS—SHEET 2.

Witnesses:
S. Newman
H. O. Penny

Inventor:
Hermann Anschütz-Kaempfe.
By his Attorney.
F. H. Richards

UNITED STATES PATENT OFFICE.

HERMANN ANSCHÜTZ-KAEMPFE, OF KIEL, GERMANY.

GYROSCOPE.

973,611.  Specification of Letters Patent.  Patented Oct. 25, 1910.

Application filed October 12, 1907. Serial No. 397,073.

*To all whom it may concern:*

Be it known that I, HERMANN ANSCHÜTZ-KAEMPFE, doctor of philosophy, a subject of the Empire of Germany, residing at 20 Dammstrasse, Kiel, in the Kingdom of Prussia, Germany, have invented certain new and useful Improvements in Gyroscopes, of which the following is a specification.

This invention relates to a gyroscopic apparatus in which the disturbing influences to which a gyroscope, having its axis of rotation held fast in a horizontal plane on a movable support, is generally subjected, and which tend to destroy the equilibrium are balanced.

Figure 1:
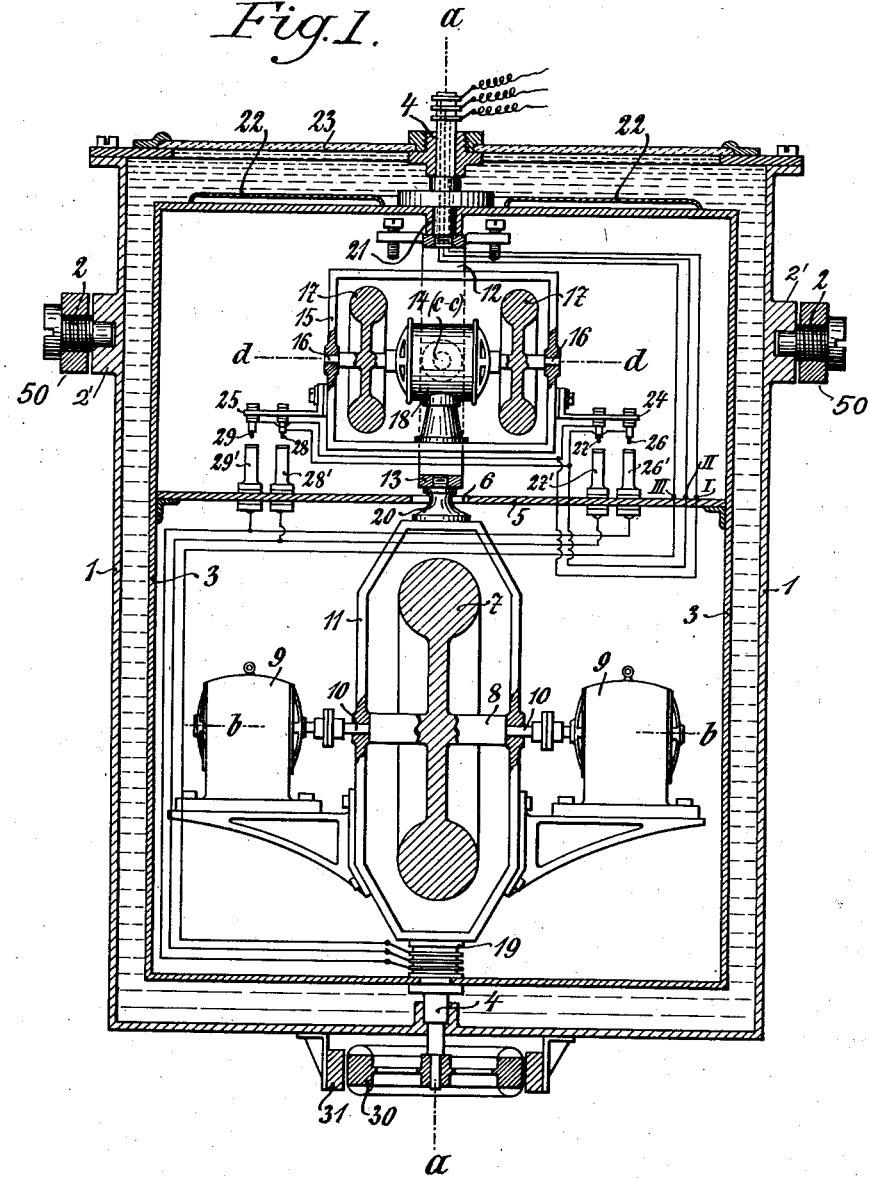
Figure 2:
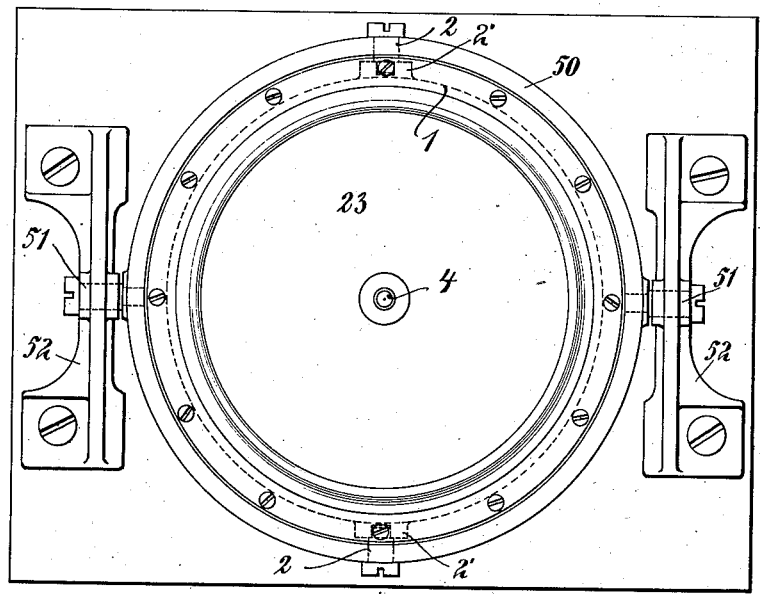
Figure 3:
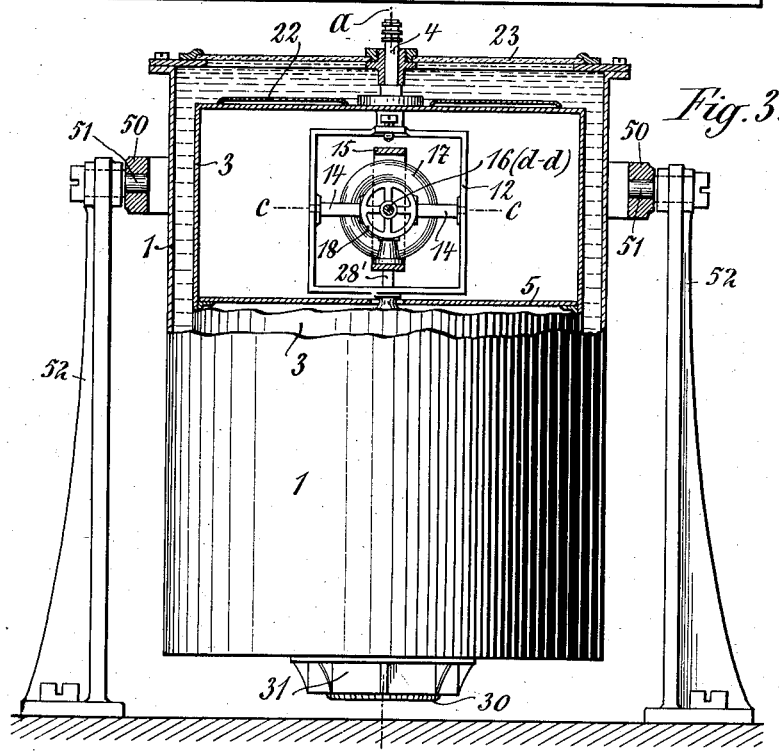

Figure 1 of the drawings shows a practicable embodiment of a form of the invention in vertical cross section. Fig. 2 is a top plan view of the mechanism illustrated in Fig. 1. Fig. 3 shows a side view of the mechanism illustrated in Fig. 1, but seen at about right angles to the position illustrated in Fig. 1.

The invention is based on the well known fact that a gyroscope, the axis of rotation of which is entirely or partly fixed in the horizontal plane, makes oscillations about the meridian. These oscillations can best be compared to those of a pendulum, only that they take place much more slowly. Only after a large number of oscillations the gyroscope, owing to the damping action of friction, comes again to rest in the meridian in order to recommence oscillating as soon as an outside force disturbs its equilibrium position. These outside forces are in practice chiefly acceleration pressures which act on the gyroscopic apparatus and always appear when the gyroscopic apparatus is mounted on a movable support. It may be said that an ordinary gyroscope on a ship could not be used as a compass, as the instrument's own oscillations cannot be distinguished from the movements of the ship owing to their long duration.

The object of this invention is to prevent these oscillations as much as possible and in the event of their taking place to damp them quickly without affecting the accuracy of adjustment of the gyroscope in the meridian. This is effected by a combination of two different gyroscopes which are rigidly connected to one and the same vertical spindle, so that an angular rotation or gyration of one gyroscope brings about a similar angular rotation of the other gyroscope. The two gyroscopes are however, so formed that they have different periodic time of oscillations. The periodic time of oscillations is, as is well known, dependent on the one hand on the impulse acting on the gyroscope, and on the other hand on the force which retains it in the horizontal plane.

In the following description, the gyroscope with oscillations of short periodic time will be called the "director" as it always tries to bring the compass rose into the meridian while the gyroscope with oscillations of long periodic time duration will be called the "damper" as it damps by its action the oscillations of the director and also any impetus which the director may experience owing to the force of acceleration.

The working of the combined apparatus is as follows: The quickly oscillating director has the tendency to carry with it the slowly oscillating damper, and consequently exercises a turning movement or torque on the same about the vertical axis. This torque results however, in accordance with the gyroscope laws, in an elevation or raising of the axis of the damper. Owing to this elevation, a force may be released which exercises a braking action on the director until, owing to the stability of the damper, the latter comes back into the horizontal position. Then the same process begins again. It will be seen that in this way an exceedingly strong damping of the director is obtained, while the exact adjustment in the meridian is in no way affected, as the damper itself has also the tendency to bring its axis to coincide with the meridian. A similar result is obtained when forces of acceleration act on the gyroscope system, that is, the angle of error is in inverse ratio to the time of oscillation. The error of the damper can, therefore be easily maintained within such small limits that it need not be considered in practice. The director on the contrary under the influence of the forces of acceleration endeavors to make a considerable angular oscillation and to carry with it the damper. Owing to the momentum of forces transmitted, the axis of the damper is raised and (as already stated) brings about a damping action. In that way an oscillation of the director, and therefore an oscillation of the compass rose, are rendered impossible or maintained within the required limits.

A constructional form of the gyroscopic apparatus in accordance with the invention is illustrated in the accompanying drawing. The construction selected for this illustration is one in which the damper has "three degrees of freedom," that is to say, an endless time of oscillation. The method of operation will thus be easier to understand. It must however, be expressly mentioned that the chief point is merely a difference in the periodic time of oscillation of the two gyroscopes.

The braking of the director, which in this particular case may also be constituted by a return rotation, is obtained in the gyroscopic apparatus illustrated by means of an electric rotating field, the circuit of which is closed by the damper in such manner that it exercises its action in every case in the correct direction.

When certain terms and expressions herein employed are considered in the light of ultra technical dictionary definitions there are not found two complete and independent gyroscopes, since each of the gyroscopes illustrated herein employs some of the portions of the structure of the other for its completion. There are two connected structures, each gyroscopic in itself, and these may, for convenience, be termed "gyroscopic members," each of which is connected to the rotatable spindle mounted in a vertical position and embodying the said spindle to constitute a gyroscope.

In a vessel 1 which is suspended by means of a gimbal joint, is arranged a capsule or casing 3 containing the gyroscopic apparatus. The casing is rotatably mounted in pins 4 about a vertical axis, the intermediate space between the vessel 1 and the casing 3 being preferably filled with some liquid, for instance alcohol. The gimbal joint herein illustrated comprises a ring 50 supported by screw studs 51 carried by the upstanding bracket 52. Screw studs 2 are shown passing through the ring 50 and engage socket bosses 2' carried by the vessel 1. These screw studs 2 are set quartering with the studs 51. The casing 3 is divided by means of a partition 5 provided with a perforation 6 into two compartments, the bottom one of which contains a gyroscope with short periodic time of oscillation (director) and the upper one a gyroscope with a long periodic time of oscillation (damper). According to the above assumption, the latter has three degrees of freedom. The bottom gyroscope consists of a fly wheel 7 mounted on a spindle 8 and rotated for instance, by an electric motor 9. The spindle is supported with its journals 10 in a frame 11 which forms a portion of the vertical axis of rotation $a\ a$. The fly wheel 7 of this gyroscope has therefore "two degrees of freedom" for it can rotate about the vertical axis $a\ a$ and the horizontal axis $b\ b$ while the third degree of freedom, rotation about the axis 51—51 of the universal or gimbal joint 2—51 is destroyed to a large extent by the weight of the apparatus. In the upper compartment, into the vertical axis of rotation $a\ a$ is built a frame 12, the bottom cross-member of which is visible in cross-section at 13. In the said frame is rotatably mounted, about a horizontal spindle 14, (which in Fig. 1 of the drawing must be imagined to be perpendicular to the plane of the paper) another frame 15, and in the latter frame is rotatably mounted by means of journals 16 a horizontal spindle on which are mounted the fly wheels 17 and the driving motor 18 of the second gyroscope. The said second gyroscope has, therefore, "three degrees of freedom" since it can oscillate first about the vertical axis $a\ a$ which it has in common with the lower gyroscope, then about the spindle 14 which can be marked as axis $c\ c$ and which as already stated, is at a right angle to the plane of the paper, and finally about the horizontal axis of rotation $d\ d$ about which the fly wheels 17 rotate and which may be spoken of as the axis of elevation.

The mechanical construction of the apparatus being sufficiently obvious no additional explanation of the drawing need be given.

The frame 11 of the lower gyroscope is secured by means of a column 19 to the wall of the casing 3. On the upper bridge or cross-member of the frame 11 is mounted a column 20 and to this latter is screwed the bottom cross-member of the frame 12, the upper cross member of which is secured by a screw 21 to the upper wall of the casing. The two frames 11 and 12, are therefore, rigidly connected together and rotate with the casing 3 to which they are secured, about the vertical axis $a\ a$ determined by the pins or journals 4. On the upper surface of the casing 3 is arranged the rose 22 of the compass which can be seen by the observer through the glass plate 23. The bottom journal 4 of the spindle $a\ a$ passes through the casing 1 and is provided at its end with a rotor 30 of a three-phase current motor, the stator 31 of which is secured to the casing 1.

The working of the apparatus is as follows:—If the fly wheel 7 is caused to rotate quickly by the electro-motors 9, the horizontal axis of rotation $b\ b$ adjusts itself to the meridian and tries to maintain that position. If a disturbance occurs, under the influence of which the rotating spindle tries to move out of its direction, that is to say, to turn about the vertical axis $a\ a$ the frame 11 receives a rotation impulse about the vertical axis, and therefore also the frame 12 which is secured to the frame 11. In the frame 12 is, however, mounted the spindle 14 $c\ c$ which in its turn carries the frame 15.

The disturbance produced has, therefore, the tendency to turn the spindle 14 (c c) in the horizontal plane out of its direction normal to the plane of the paper in Fig. 1. This action on the spindle 14 (c c) is, however, converted in accordance with the well known gyroscope laws, into an oscillation of the frame 15 about the said spindle 14 (c c) in the vertical plane that is to say, into an elevation of the axis of rotation of the fly wheels 17. The result is, therefore, that the tendency due to an outside disturbance to turn the vertical spindle, does not manifest itself by such a turning, but by an elevation of the axis d d of the gyroscope with three degrees of freedom, so that, therefore no turning of the gyroscope takes place about the vertical axis and the horizontal axis b b retains the direction of the meridian. The frame 15 carries two arms 24 and 25 at the end of each of which are two contact studs 26—27, and 28—29, under which are respectively situated mating contacts 26'—27' and 28'—29'. As soon as the elevation axis has reached a certain angle with the horizontal in one or in the other direction, either the contacts on the arm 24, or those on the arm 25, close the circuit in the rotor 30 of the three-phase current motor, the current supply wires of which are introduced by means of contact rings through one of the hollow journals 4 and connected to the terminals I, II, III, from which, as can be seen from the drawing, wires lead to the contact studs or to the motor. The three-phase motor is so connected that it always rotates in such direction that its torque always brings the gyroscope 17 back to its initial or horizontal position. The momentum produced by the motor acts, therefore, in opposition to the disturbing momentum and thus prevents the gyroscope 7 from making an oscillation constituting an error.

As the electric contacts are closed only after the axis of elevation has been inclined to a certain angle, smaller movements about the axis a a are absorbed by the energy of the gyroscope 17 itself, while in the case of stronger momenta or in the case of a summing of smaller momenta, the motor lends assistance. It may accordingly be possible for certain purposes in which the errors cannot always combine, that is to say, presumably could not exceed a given value, to make the energy of the damper so great that a correction by means of an outside auxiliary force (three phase current motor) becomes altogether unnecessary.

What I claim as my invention and desire to secure by Letters Patent is:

1. The combination with a rotatable spindle and means for sustaining said spindle in a vertical position, of two gyroscopic members each connected to said spindle and embodying the said spindle to constitute a gyroscope, one of said members having its center of gravity below its horizontal axis whereby said members will have different periodic times of oscillation.

2. In a gyroscopic apparatus, a frame, a fly wheel within said frame, means for preventing vertical movement of the axis of said fly wheel, means for supporting a fly wheel upon said first-mentioned frame and means for allowing vertical movement of the axis of said last-mentioned fly wheel substantially as described.

3. In a gyroscopic apparatus a frame, a fly wheel within said frame, an upper frame connected to said first-mentioned frame, a fly wheel within said upper frame and means for controlling the movements of the lower fly wheel by the oscillations of the upper frame, substantially as described.

4. In a gyroscopic apparatus a rotatable frame, a plurality of fly wheels therein, a casing supporting said frame, a motor upon said casing and having its rotor attached to said rotatable frame and means for energizing said motor by the gyroscopic movements of one of said fly wheels substantially as described.

5. In a gyroscopic apparatus, a casing, liquid within said casing, a vertical spindle therethrough, an inner casing upon said spindle, a frame within said casing and connected to said spindle, a plurality of fly wheels upon said frame, and electrical contacts operated by the movements of said fly wheels, substantially as described.

6. In a gyroscopic apparatus, the combination with a gyroscope having a rotary member, a fly wheel journaled in said rotary member, a universal joint for supporting the rotary member, and means for maintaining the axis of said member vertical and the axis of said fly wheel horizontal, of a frame mounted on said rotary member for oscillation in a vertical plane embracing the axis of rotation of the first mentioned fly wheel, and a fly wheel mounted in said frame and having its axis of rotation in said plane, the center of gravity of the apparatus being low relative to said universal joint whereby the periodic times of oscillation of the gyroscopes will be different.

7. In a gyroscopic apparatus, the combination with a gyroscope having a rotary member, a fly wheel journaled in said rotary member, a universal joint for supporting the rotary member, and means for maintaining the axis of said member vertical and the axis of said fly wheel horizontal, of a frame mounted on said rotary member for oscillation in a vertical plane embracing the axis of rotation of the first mentioned fly wheel, and a pair of fly wheels mounted in said frame and having their axis of rotation in said plane, said mechanism constituting with said rotary member a gyroscope, the center of gravity of the apparatus being low relative to said universal joint whereby the periodic time of oscillation of the gyroscopes will be different.

8. The combination with a director gyroscopic member having short periodic time of oscillation, and means for supporting the same and resisting the oscillations thereof in a vertical plane and permitting oscillations about a vertical axis, of a damper gyroscopic member having long periodic time of oscillation, and supporting means for this connected to the supporting means for the director gyroscopic member and oscillatory therewith about the vertical axis.

9. The combination with a main gyroscopic member and means for supporting the same and resisting the oscillations thereof in a vertical plane and permitting oscillations about a vertical axis, of a subsidiary gyroscopic member having periodic times of oscillation different to those of the main gyroscopic member and supporting means for this connected to the supporting means for the main gyroscopic member and oscillatory therewith about the vertical axis.

10. In a gyroscopic apparatus, the combination with a frame rotatable upon a vertical axis, a fly wheel mounted in said frame and means for restraining vertical oscillations of the axis of said fly wheel, of a fly wheel and means for supporting said fly wheel on said frame for permitting vertical oscillations of the axis thereof.

In witness whereof I have hereunto signed my name this 20 day of September 1907 in the presence of two subscribing witnesses.

HERMANN ANSCHÜTZ-KAEMPFE.

Witnesses:
    FRIEDR. TRESZCHKE,
    JULIUS RÒPKE.